United States Patent
Luepke et al.

(10) Patent No.: US 8,148,031 B2
(45) Date of Patent: Apr. 3, 2012

(54) SOLID OXIDE PROTON CONDUCTOR SYSTEM AND METHOD OF OPERATING SAME FOR ENHANCED PROTON TRANSPORT

(75) Inventors: Gunter Luepke, Williamsburg, VA (US); Erik J. Spahr, Williamsburg, VA (US)

(73) Assignee: College of William and Mary, Williamsburg, VA (US)

( * ) Notice: Subject to any disclaimer, the term of this patent is extended or adjusted under 35 U.S.C. 154(b) by 342 days.

(21) Appl. No.: 12/617,387

(22) Filed: Nov. 12, 2009

(65) Prior Publication Data
US 2010/0119889 A1 May 13, 2010

Related U.S. Application Data

(60) Provisional application No. 61/114,080, filed on Nov. 13, 2008.

(51) Int. Cl.
*H01M 8/10* (2006.01)
*C07C 1/00* (2006.01)
*H01L 27/14* (2006.01)
*C01D 1/00* (2006.01)

(52) U.S. Cl. ............... 429/495; 204/157.15; 204/157.51; 257/431

(58) Field of Classification Search .................... 429/495
See application file for complete search history.

(56) References Cited

U.S. PATENT DOCUMENTS
7,033,690 B1   4/2006 Akikusa et al.
2010/0255387 A1*  10/2010 Ramanathan et al. ........ 429/408

OTHER PUBLICATIONS

"Giant Enhancement of Hydrogen Transport in Rutile TiO2 at Low Temperatures" Spahr et al, Physical Review Letters, May 2010 (published after effective filed of application).*
Trakhtenberg et al.; "Effect of pressure and temperature on the H-atom tunneling in solid phase chemical reactions. The acridine/fluorine system", Chemical Physics, vol. 232 (1998), pp. 175-187.
Leiderman et al.; "Effect of temperature on excited-state proton tunneling in wt-green fluorescent protein", J. Phys. Chem. B, vol. 112 (2008), pp. 1232-1239.
Kreuer et al.; "Transport in Proton Conductors for Fuel-Cell Applications: Simulations, Elementary Reactions, and Phenomenology", Chemical Reviews, vol. 104 (2004), pp. 4637-4678.

* cited by examiner

*Primary Examiner* — Patrick Joseph Ryan
*Assistant Examiner* — Lucas O Donnell
(74) *Attorney, Agent, or Firm* — Jason P. McDevitt

(57) ABSTRACT

A proton conductor system includes a solid oxide having at least one hydrogen vibrational mode defined by a bandwidth and resonance frequency. A light source irradiates the solid oxide with infrared light in a wavelength band having a center frequency matching the resonance frequency.

36 Claims, 10 Drawing Sheets

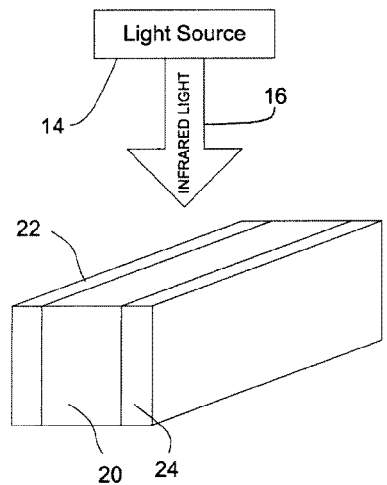 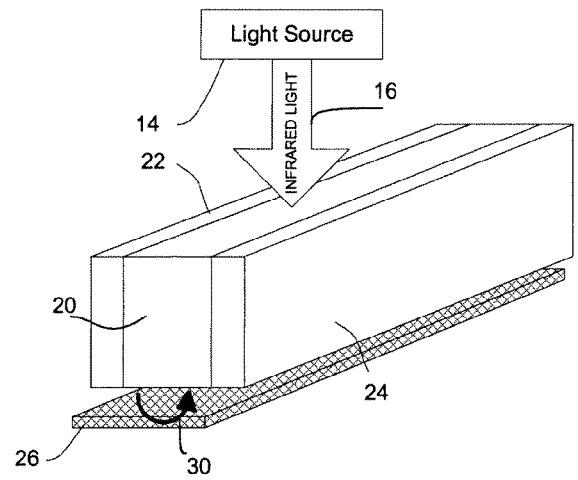
FIG. 3A    FIG. 3B
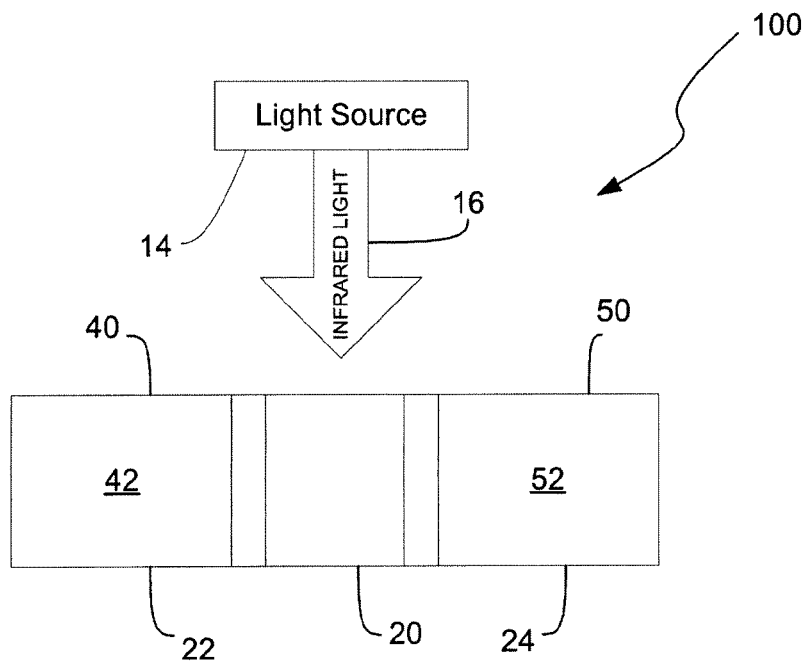
FIG. 3C

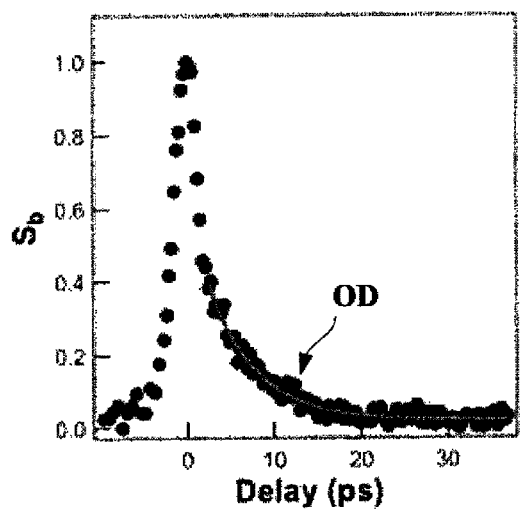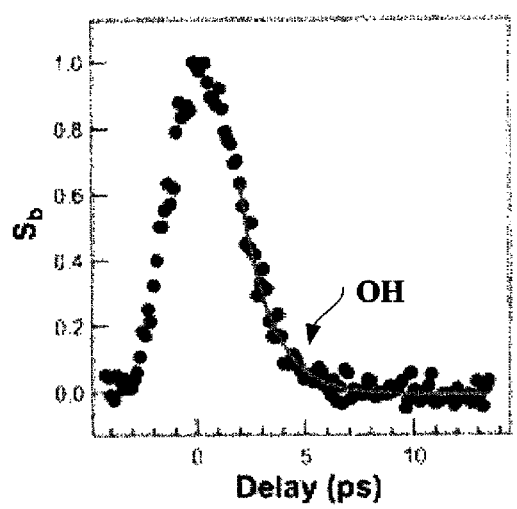
FIG. 7A  FIG. 7B

US 8,148,031 B2

SOLID OXIDE PROTON CONDUCTOR SYSTEM AND METHOD OF OPERATING SAME FOR ENHANCED PROTON TRANSPORT

CROSS-REFERENCE TO RELATED APPLICATIONS

Pursuant to 35 U.S.C. §119, the benefit of priority from provisional application Ser. No. 61/114,080, with a filing date of Nov. 13, 2008, is claimed for this non-provisional application.

STATEMENT REGARDING FEDERALLY SPONSORED RESEARCH AND DEVELOPMENT

This invention was made with government support under Grant No. DMR-06-00861 awarded by the National Science Foundation. The government has certain rights in the invention.

FIELD OF INVENTION

The field of the invention relates generally to solid oxide proton conductors, and more particularly to a solid oxide proton conductor system for use in a variety of applications, and a method of operating the system for enhanced proton transport.

BACKGROUND OF THE INVENTION

The scientific literature regarding electrolytes, including solid oxide proton conductors, is extensive. For many applications, solid electrolytes are advantageous because they can yield greater durability and efficiency, and reduce corrosion concerns. For example, solid electrolytes are useful in fuel cells.

Fuel cells are energy-converting devices that use an oxidizer (e.g., oxygen in air) to convert the chemical energy in fuel (e.g., hydrogen) into electricity. A solid oxide fuel cell ("SOFC") generally comprises a solid electrolyte layer with an oxidizer electrode (cathode) on one side of the electrolyte and a fuel electrode (anode) on the other side. SOFCs are one of the most promising fuel cell designs for stand-alone and commercial high power applications. Advantages of SOFCs include high efficiencies, long term stability, fuel flexibility, low emissions, and cost. They typically require the addition of "start-up" heat until they attain their intermediate to high operating temperatures (400-1000° C.) in order to reach efficiencies on the order of 60%. The high operational temperatures can be put to good use; for example, when excess heat can be used to drive a conventional turbine for hybrid power generation. However, the high operational temperature is also the largest disadvantage of SOFCs, resulting in longer start-up times, chemical compatibility concerns, and mechanical breakdown.

There is a need in the art for a solid oxide proton conductor system that implements an improved method to increase proton migration at lower temperatures through the conductor. Such a system and method, and resulting compositions and articles, could be very useful in many applications, including fuel cells.

BRIEF SUMMARY OF THE INVENTION

Accordingly, it is an object of the present invention to provide a solid oxide proton conductor system.

Another object of the present invention is to provide a metal oxide proton conductor system.

Still another object of the present invention is to provide a method of increasing the proton transfer rate through a solid oxide.

Yet another object of the present invention is to provide a method of increasing the proton transfer rate through a metal oxide during its use in power applications.

In accordance with the present invention, a proton conductor system includes a solid oxide having at least one hydrogen vibrational mode defined by a bandwidth and resonance frequency. A light source irradiates the solid oxide with infrared light in a wavelength band having a center frequency matching the resonance frequency. The solid oxide can be a metal oxide thereby making the present invention suitable for use in many power applications including solid oxide fuel cell applications.

BRIEF DESCRIPTION OF THE DRAWINGS

The summary above, and the following detailed description, will be better understood in view of the drawings that depict details of preferred embodiments.

FIG. 3A is a schematic view of a plate-shaped metal oxide proton conductor system with electrodes coupled to opposing surfaces of the conductor and an infrared light source for irradiating the conductor in accordance with an embodiment of the present invention; FIG. 3B is a schematic view of the plate-shaped metal oxide proton conductor system of FIG. 3A that further includes a reflector for directing infrared light passing through the conductor back to the conductor; FIG. 3C is a schematic view of an embodiment of a fuel cell using the metal oxide proton conductor system of FIG. 3A.

FIG. 7A is a graph showing the transient bleaching signal $S_b$ from O-D vibrational mode as a function of time for a titanium dioxide proton conductor; and FIG. 7B is a graph showing the transient bleaching signal $S_b$ from O—H vibrational mode as a function of time for a titanium dioxide proton conductor.

DETAILED DESCRIPTION OF THE INVENTION

Figure 1:
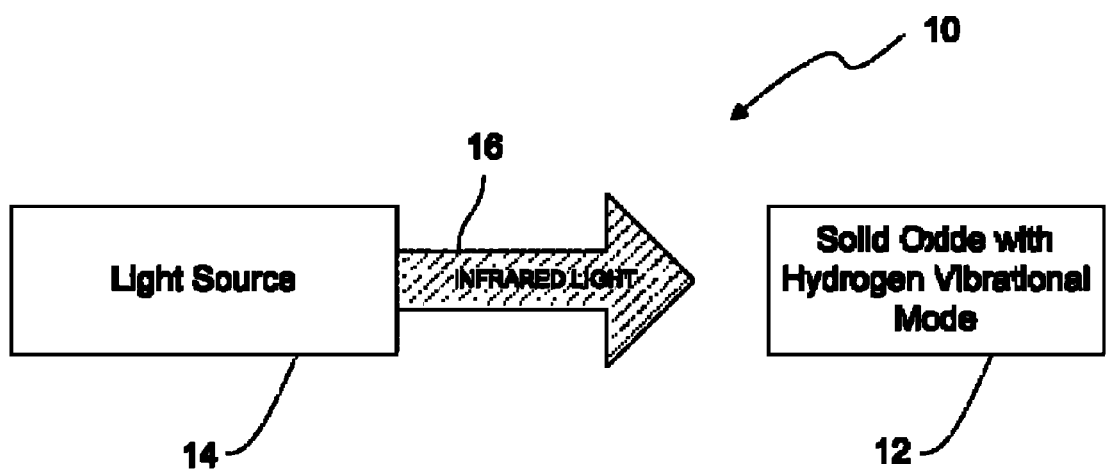
FIG. 1 is a schematic view of a solid oxide proton conductor system in accordance with the present invention.

The present invention is directed to a solid proton conductor system as well as a method for increasing proton conduction across the conductor. Referring now to the drawings and more particularly to FIG. 1, a solid oxide proton conductor system in accordance with the present invention is shown and is referenced generally by numeral 10. Briefly, system 10 increases proton (i.e., hydrogen ion or proton as is known in the art) migrations through a solid oxide 12. In general, solid oxide 12 has one or more hydrogen vibrational modes such as O—H or O-D stretch or bend modes. Each such mode has a narrow bandwidth and a resonance frequency associated therewith. While the present invention can be practiced for more than one vibrational mode at the same time, the following description will be directed to one vibrational mode as multiple vibrational modes would be treated in a similar fashion.

The present invention increases the proton conduction rate through solid oxide 12 by irradiating solid oxide 12 with light from the infrared spectrum. Briefly, a light source 14 irradiates solid oxide 12 with continuous wave or pulsed infrared light 16 in a wavelength band that has a center frequency matched to the resonance frequency of a selected hydrogen vibrational mode of solid oxide 12. Light source 12 can be any single or multiple element light source that directs or otherwise couples infrared light 16 to solid oxide 12. Such light source(s) include, but are not limited to, light emitting diodes, laser diodes, and arrays thereof. Infrared light 16 can be coupled to solid oxide 12 through a gaseous or vacuum medium, or through the use of optical waveguides or fillers without departing from the scope of the present invention.

Figure 2A:
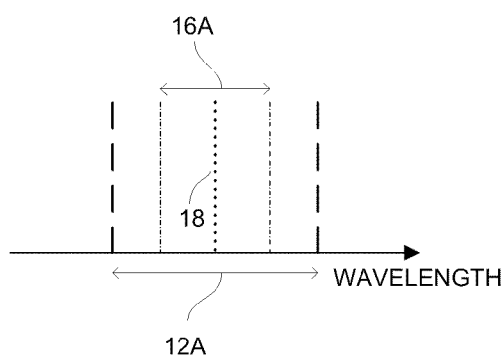
FIG. 2A is a graphic depiction of the wavelength relationship between a hydrogen vibrational mode of a solid oxide and the infrared light used to irradiate the solid oxide in accordance with an embodiment of the present invention.
Figure 2B:
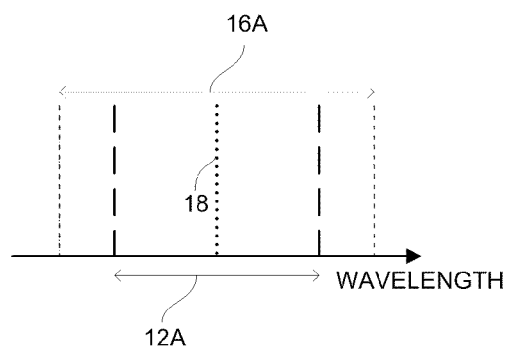
FIG. 2B is a graphic depiction of the wavelength relationship between a hydrogen vibrational mode of a solid oxide and the infrared light used to irradiate the solid oxide in accordance with another embodiment of the present invention.
Figure 2C:
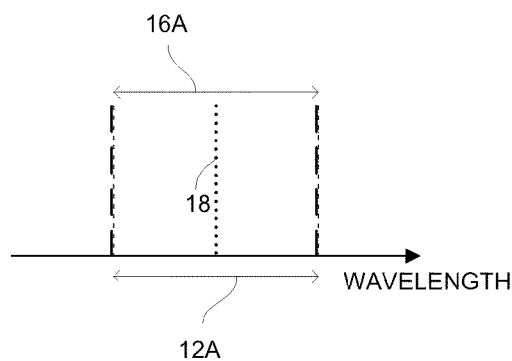
FIG. 2C is a graphic depiction of the wavelength relationship between a hydrogen vibrational mode of a solid oxide and the infrared light used to irradiate the solid oxide in accordance with another embodiment of the present invention.

The relationship between the bandwidth of a selected hydrogen vibrational mode and the wavelength band of infrared light 16 can be varied depending on the needs of a particular application. For example and as depicted in FIG. 2A, the wavelength band (illustrated by the span denoted by two headed arrow 16A) of infrared light 16 can be less than the bandwidth (illustrated by the span denoted by two headed arrow 12A) of a selected hydrogen vibration mode in the solid oxide 12. This scenario is used when the proton transfer rate must be increased primarily at the central frequency of the mode's bandwidth. Note that the center frequency of band 16A matches the resonance frequency of the vibrational mode as denoted by a dashed line 18 that is centrally positioned in each of bandwidth 12A and wavelength band 16. However, it is to be understood that the present invention is not limited to this scenario as FIG. 2B depicts a scenario where the wavelength band 16A is greater than the bandwidth 12A, and FIG. 2C depicts a scenario where the wavelength band 16A and bandwidth 12A are equal to one another. The scenarios depicted in FIG. 2B and FIG. 2C might be used when technological factors limit the wavelength band of the infrared light.

Regardless of which of the above scenarios is used, irradiation with infrared light 16 is carried out whenever solid oxide 12 is to perform its proton conduction function. That is, the present invention is not a pre-treatment, but is instead a system and method that provides enhanced/increased proton conduction when solid oxide 12 is used for (or in) its intended application. As will be explained further below, such applications include hydrogen creation, hydrogen storage, and power applications such as solid oxide fuel cells, dehydrogenation pumps, steam electrolyzes for hydrogen production, and hydrogen sensors.

A solid oxide proton conductor system of the present invention can be used in a variety of power applications. In power applications, the solid oxide is typically a metal oxide having two spaced-apart electrodes (i.e., an anode and a cathode) coupled thereto. The metal oxide can be a crystal or amorphous structure, but must be one that has the ability to conduct (hydrogen) protons.

In general and on the atomic level, the metal oxide should have at least one oxygen atom and one or more metallic atoms. For example, suitable metal oxides include, but are not limited to, perovskite-type oxides, binary oxides (e.g., titanium dioxide or $TiO_2$), ionic hydroxides, transparent conducting oxides, and combinations thereof. Perovskite-type oxides are of the $ABO_3$ class (e.g., strontium titanium oxide or $SrTiO_3$, barium titanium oxide or $BaTiO_3$, strontium cesium oxide or $SrCeO_3$, barium chromium oxide or $BaZrO_3$, barium cesium oxide or $BaCeO_3$, and potassium tantalum oxide or $KTaO_3$). As is well-known in the art, these perovskite-type oxides typically include dopants to alter the conductivity, and thus the exact molecular formulas are not reflected in the simplified formulas provided above. For some applications, it may be desirable to maximize hydrogen uptake at the metal oxide's surface. In such cases, the metal oxide can be acceptor-doped having transition-metal ions with a lower valence than the metal oxide's host ions (e.g., for potassium tantalum oxide, this involves substitution of $Ta^{5+}$ by transition-metals with a lower valance of 3+ or 2+). Such doping is performed prior to use of the metal oxide in a proton conductor system of the present invention.

Figure 3D:
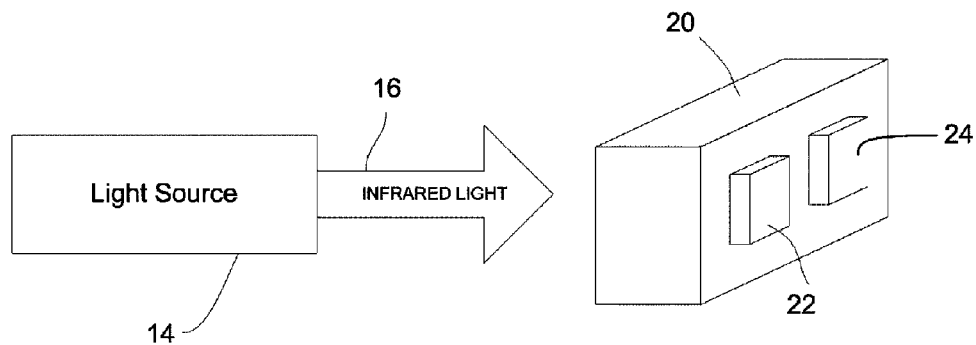
FIG. 3D is a schematic view of a plate-shaped metal oxide proton conductor system with spaced-apart electrodes coupled to one surface of the conductor and an infrared light source for irradiating an opposing surface of the conductor in accordance with another embodiment of the present invention.

Several metal oxide proton conductor systems of the present invention, and applications using same, are illustrated in FIGS. 3A-3E. In FIG. 3A, a plate or plate-like piece of a metal oxide 20 is sandwiched between two electrodes 22 and 24. A light source 14 irradiates metal oxide 20 with infrared light 16 as described above. FIG. 3B illustrates a similar structure to that shown in FIG. 3A, and also adds a reflective element(s) 26 on a side of metal oxide 20 that opposes light source 14. This embodiment conserves and re-uses infrared light 16 as element(s) 26 reflects any of infrared light 16 that passes through metal oxide 20 back to metal oxide 20 as indicated by arrow 30.

One of the most important applications of the present invention is its incorporation in a solid oxide fuel cell. For example, the structure illustrated in FIG. 3A could be incorporated into a dual chamber fuel cell 100 as illustrated in FIG. 3C. More specifically, a container 40 houses a hydrogen-based fuel gas 42 (e.g., pure hydrogen, methanol, ethane, or other hydrocarbon gas) such that fuel gas 42 is exposed to electrode (anode) 22. A container 50 houses an oxidizer 52 (e.g., pure oxygen, air, or other oxidizing gas) such that oxidizer 52 is exposed to electrode (cathode) 24. By operating fuel cell 100 while irradiating metal oxide 20 with infrared light 16, proton transport across metal oxide 20 is enhanced so that fuel cell 100 will achieve operational efficiency at lower temperatures. Further, the increase in protonic current increases electrical power.

Another metal oxide proton conductor structure is illustrated in FIG. 3D where a plate-like metal oxide 20 has electrodes 22 and 24 coupled to the same surface thereof in a spaced-apart fashion. This type of structure could be incorporated into a single-chamber fuel cell provided both electrodes 22 and 24 are able to react to the same "fuel." In this configuration, light source 14/infrared light 16 can be coupled to metal oxide 20 from the side thereof that opposes the side on which electrodes 22 and 24 are mounted.

Figure 3E:
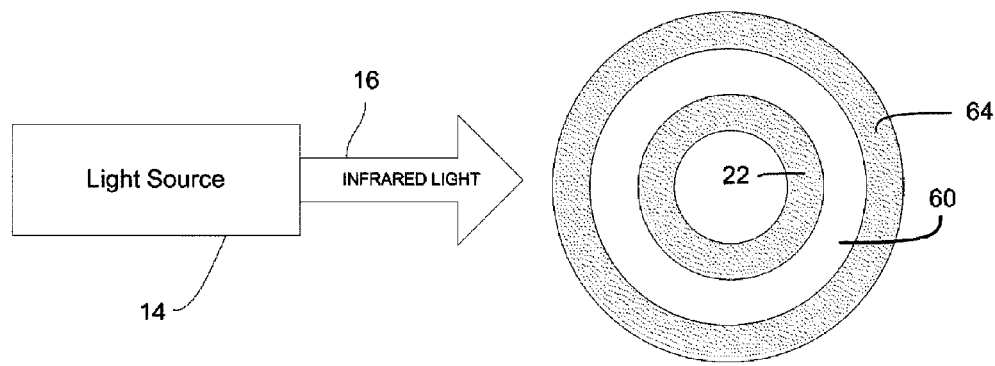
FIG. 3E is an end view of a metal oxide proton conductor system using tube-shaped metal oxide and electrodes in accordance with another embodiment of the present invention.

The present invention is also not limited to use with plate or plate-like solid/metal oxides. For example, FIG. 3E illustrates a tubular-shaped metal oxide 60 with corresponding shaped tubular electrodes 62 and 64 coupled to the inner and outer surfaces, respectively, of metal oxide 60. Irradiation of metal oxide 60 with infrared light 16 in accordance with the present invention could occur from the side of the structure provided electrode 64 was transparent with respect to infrared light 16, or at least the portion(s) thereof used for proton conduction enhancement.

The mechanism for proton conduction is either proton tunneling or proton hopping. The present invention increases the rate of these mechanisms. As used herein, the "proton tunneling rate" refers to the rate at which a proton quantum mechanically tunnels from one $O^{2-}$ ion host site to an adjacent host site along the direction of O—O near neighbors in a metal oxide structure. The "proton hopping rate" refers to the rate at which the proton breaks its bond with the host and physically moves to form a bond with a different nearby oxygen ion. This process can be along the O—O direction or can involve a reorientation of the proton around its host prior to transfer to a nearby oxygen ion.

By exposing a metal oxide to infrared light, the proton tunneling or hopping rate, both components of proton conductivity, can be dramatically increased as demonstrated by examples described below. The infrared illumination can be used to control proton transport, thereby providing an additional means to regulate performance and current flow. For example, infrared light sources in the form of diodes can be turned on or off to regulate output.

EXAMPLES

Exemplary investigations supporting the proton conduction enhancements provided by the present invention are presented below. The examples that follow are intended in no way to limit the scope of this invention, but are provided to illustrate representative embodiments of the present invention. Many other embodiments of this invention will be apparent to one skilled in the art.

To investigate the vibrational lifetime of the O—H (3487 $cm^{-1}$) and O-D stretch modes (2577 $cm^{-1}$) in $KTaO_3$, picosecond (ps) infrared transient bleaching experiments were used. In accordance with the teachings of the present invention, the OH dipole is excited to its first vibrational state by a pump beam tuned to the absorption frequency of the oscillator. This excitation causes an increase in the transmission coefficient that is proportional to the population of the excited state. A probe beam delayed in time can be varied to monitor this change in transmission yielding a direct measurement of the oscillatory decay (lifetime) of the vibrational mode. An optical parametric amplifier is used to tune the pump and probe beams to the resonant frequencies. Both pump and probe beams are incident on the solid oxide proton conductor ($KTaO_3$) surface. Note that no electrodes were used for this proof of principle experiment.

In this investigative example, high purity $KTaO_3$ single crystals were hydrogenated (or deuterated) to a concentration of ~$10^{17}$ $cm^{-3}$ by annealing in $H_2O$ (or $D_2O$) vapor for one hour (four hours for deuterium) at 1350° K. Picosecond infrared transient bleaching experiments as described above were then performed on the $KTaO_3$ material using an ultrafast optical parametric amplifier (OPA) laser, which delivered infrared pulses with duration of about 2 ps, a spectral width (full width at half maximum) of about 15-20 $cm^{-1}$, and a pulsing rate of 1 kHz. Results are described below, with proton tunneling rates extracted from the temperature dependence of the vibrational lifetimes.

Figure 4:
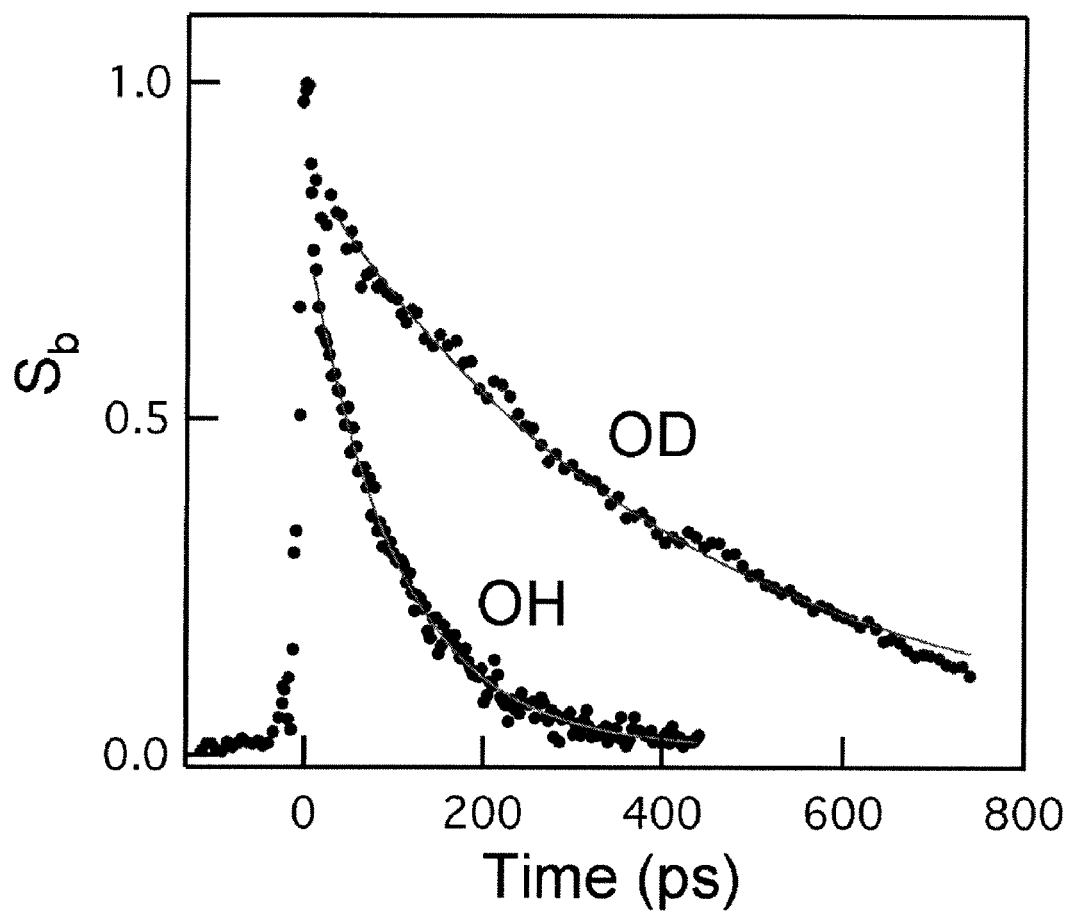
FIG. 4 is a graph showing the transient bleaching signal $S_b$ from O—H and O-D stretch vibrational modes as a function of time for a potassium tantalum oxide proton conductor.

FIG. 4 shows hydrogen vibrational lifetime measurements for the $KTaO_3$ material during infrared irradiation. The time-resolved transient bleaching signal $S_b$ of the O—H and O-D stretch modes exhibits unusually long lifetimes of $T_1$=100 ps and 400 ps, respectively, the latter representing one of the longest vibrational lifetimes so far reported for a hydrogen vibrational mode in a solid. This observation is remarkable considering that such long lifetimes have been previously reported only for hydrogen-vacancy complexes in covalent semiconductors (Si and Ge) where the open lattice structure reduces the coupling to the phonon bath.

Typically, for the O—H stretch mode, the most probable accepting channel is the bending mode as its frequency is localized above the phonon spectrum. We find the O—H bend mode at 1058 $cm^{-1}$ and, for the O-D bend mode, a frequency of approximately 755 $cm^{-1}$ has been estimated. This result that is consistent with the position of the combination mode and a small anharmonic shift. Therefore, the most likely decay channel of the O—H or O-D stretch modes consists of three bend modes plus one residual phonon near 313 $cm^{-1}$. The high number of exchange modes, as well as the weak coupling to the bending motion, may be responsible for the long lifetime of the O—H (O-D) stretch mode. The long lifetime of the 3487 $cm^{-1}$ mode seems to be quite common in the perovskite-type oxides; however, the O—H (O-D) linewidth of 0.12 (0.097) $cm^{-1}$ observed in this work is not representative of the vibrational lifetime. Hence, vibrational lifetimes of the O—H and O-D stretch mode can not be accurately determined from infrared absorption measurements.

The long lifetime of the O—H and O-D stretch mode can have a strong effect on the proton transfer rate. Dissociation of O—H and O-D bonds via vibrational excitation can be described by the truncated harmonic oscillator (THO) model. This model describes the O—H and O-D bonds as harmonic oscillators, and assumes that the bonds dissociate at a rate given by the rate of excitation from the highest bound state $|N_{max}\rangle$ to the lowest unbound state $|N_{max}+1\rangle$. Within this model, the dissociation rate is approximately given by $$R \approx \frac{N_{max}+1}{T_1}\left(\frac{\Gamma_{exc}}{\Gamma_{exc}+1/T_1}\right)^{N_{max}+1},$$

where $\Gamma_{exc}$ is the excitation rate. A short lifetime $T_1$ requires a large $\Gamma_{exc}$ for bond breaking to proceed via this mechanism, while a large $T_1$ can yield a high dissociation rate. The THO model suggests that the observed long lifetime of the O—H stretch mode plays an important role in the high proton conductivity in perovskite-type oxides.

FIG. 4 shows that the lifetime of the O-D mode is significantly longer than the O—H mode at low temperatures. This large reverse isotope effect is unexpected based on the frequency-gap law, which predicts a shorter lifetime for the mode with the lower frequency. Since both stretch modes most likely decay into three bending modes and a residual phonon around 313 $cm^{-1}$, the THO model predicts that the multi-phonon decay rate of these two modes will be similar.

Clearly, the THO model does not predict the behavior that was observed experimentally, suggesting that there is an additional mechanism responsible for the different decay rate of the O—H stretch mode.

Figure 5:
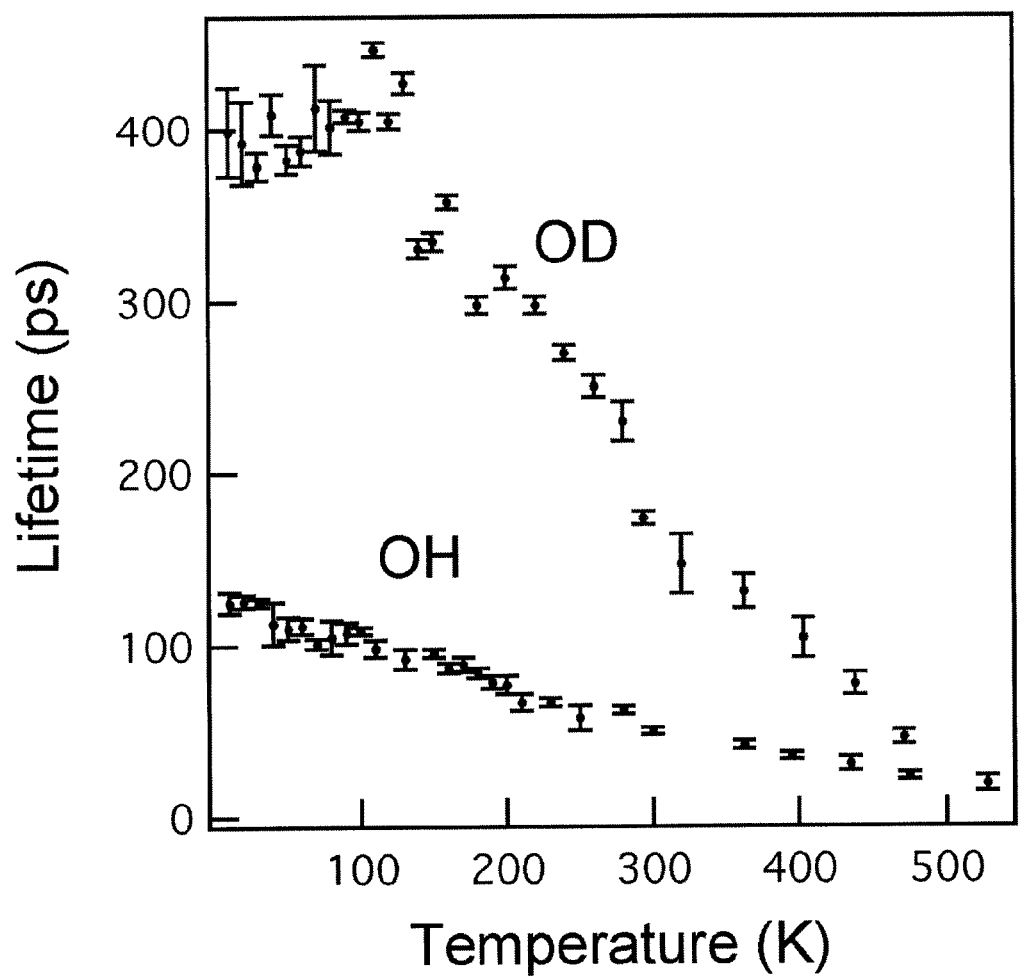
FIG. 5 is a graph depicting the vibrational lifetimes of the O—H and O-D stretch modes as a function of temperature for a potassium tantalum oxide proton conductor.
Figure 6:
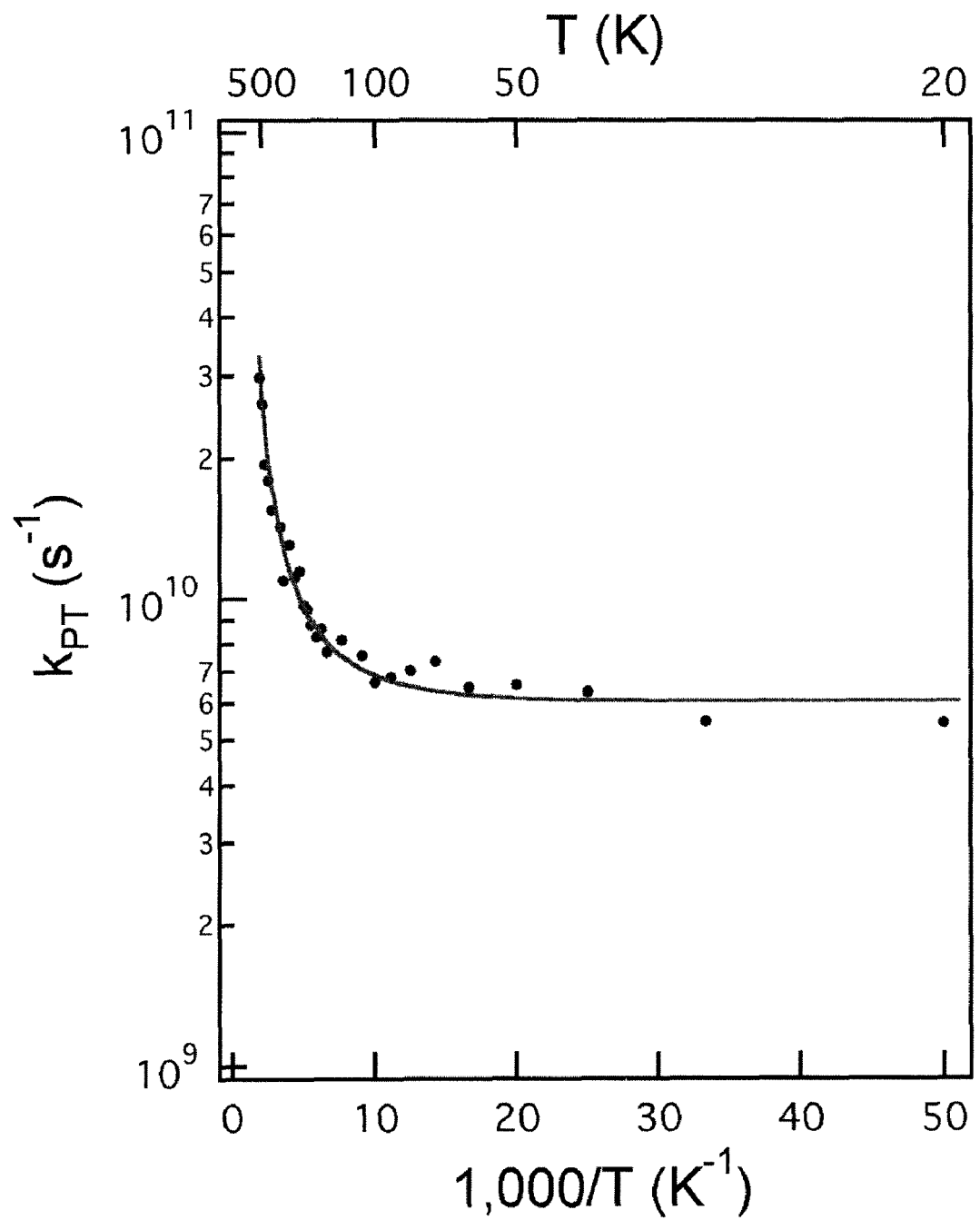
FIG. 6 is a graph showing the experimentally-calculated proton tunneling rate $k_{PT}$ as a function of inverse temperature for a potassium tantalum oxide proton conductor.

To address this issue, important information about the decay mechanism of the local mode is obtained from the temperature dependence of the vibrational lifetime, which is shown in FIG. 5. The lifetime of the O—H stretch mode exhibits unusual temperature dependence, i.e., it decreases almost immediately at low temperatures with a very gentle slope. In contrast, the O-D mode shows typical behavior of a multi-phonon decay process, i.e., a broad plateau at low temperatures followed by a steep decline at elevated temperatures. Moreover, the large reverse isotope effect is most dominant at low temperatures. These data indicate that the decay mechanisms of the O—H and O-D stretch modes are quite different. Clearly, an additional decay mechanism causes the shorter lifetime of the O—H mode, i.e., the reverse isotope effect, and also the difference in the temperature dependence.

This additional decay mechanism can be attributed to a proton transfer process. There are two possible mechanisms: the proton can hop over or tunnel through the potential barrier. Either process would lead to a large reverse isotope effect because of the difference in zero point energy. However, the former process requires activation energy of about 0.89 eV for the proton to cross over the barrier in $KTaO_3$, and this thermally-activated process should vanish at low temperatures. This requirement is inconsistent with the experimental data shown in FIG. 5. Hence, the additional decay mechanism can be attributed to proton tunneling. It is believed that the tunneling rate for deuterium is negligible. Therefore, the multi-phonon decay rate can be estimated as $1/T_1$ of the O-D mode. Since both modes are expected to have approximately the same multi-phonon decay rate, the proton-tunneling rate can be estimated as $k_{PT}=1/T_{1(O—H)}-1/T_{1(O-D)}$.

Using the above, FIG. 5 shows the experimental proton-tunneling rate $k_{PT}$ as a function of inverse temperature. The rate constant $k_{PT}$ at room temperature is about $(70\ ps)^{-1}$, while at 70° K it is $(135\ ps)^{-1}$. At lower temperatures, $k_{PT}$ is close to being temperature-independent (10-70° K). An excellent fit was obtained between $k_{PT}$ and an expression for a phonon-assisted tunneling process derived by Trakhtenberg and coworkers (Trakhtenberg et al., *Effect of pressure and temperature on the H-atom tunneling in solid phase chemical reactions. The acridine/fluorine system. Chem. Phys.* 232, (1998), 175-187). The frequency of the assist phonon was determined to be $228\pm51\ cm^{-1}$. It is believed that this phonon mode assists considerably in the tunneling process by altering the O—O distance and thereby reducing the height and the width of the tunneling barrier. The observed temperature dependence and absolute values of $k_{PT}$ are in excellent agreement with the recently reported proton-transfer rate of a green fluorescent protein in $H_2O$ (see Leiderman et al., *Effect of temperature on excited-state proton tunneling in wt-green fluorescent protein. J. Phys. Chem. B* 112, (2008), 1232-1239) which was attributed to excited-state proton tunneling assisted by an intermolecular vibration of two oxygen atoms at $210\ cm^{-1}$, thereby pointing towards a universal behavior.

The observation of phonon-assisted tunneling is further corroborated by the association of this process with the decay of the O—H stretch mode. This data is consistent with an incoherent tunneling process wherein the interaction with the phonon bath leads to dephasing of the vibrational mode. Here, the phonon-assisted tunneling process results in population relaxation of the O—H stretch mode. High-resolution infrared absorption spectra of the O—H and O-D stretch modes do not exhibit proton or deuteron tunnel splitting and, thus, give no evidence for coherent tunneling. Even below 70° K, where $k_{PT}$ is weakly temperature-dependent, the self-trapping distortion localizes the light interstitial at a specific lattice site and, because neighboring sites are not equivalent, most likely prevents coherent tunneling.

Accordingly, in this experimental example, enhanced proton tunneling in the perovskite-type oxide $KTaO_3$ has been demonstrated. The tunneling rate is extracted from the vibrational lifetimes of the O—H and O-D stretch modes measured by pump-probe infrared spectroscopy. Both stretch modes are exceptionally long-lived and exhibit a large "reverse" isotope effect due to the phonon-assisted tunneling process, which involves the O—Ta—O bending motion. This suggests that the high protonic conductivity in perovskite-type oxides is aided by an exceptionally long lifetime of the proton transfer mode. By exposing the perovskite-type oxide to suitable infrared illumination, the proton tunneling rate increases dramatically, by a factor of approximately seven orders of magnitude relative to the calculated proton tunneling rate in the absence of exposure to the infrared light.

Another example of the present invention involves the binary oxide, titanium dioxide or $TiO_2$. In general, infrared photon-stimulated proton migration in $TiO_2$ was demonstrated at low temperatures (10 to 270° K). Here, proton conduction was in the form of the more efficient proton hopping. Measurements of the vibrational lifetime of the O—H ($3287\ cm^{-1}$) and O-D ($2445\ cm^{-1}$) stretch modes made during irradiation of $TiO_2$ with infrared light revealed a fast decay via a reorientation transfer step with a jump rate of approximately 1 THz at room temperature, i.e., two orders of magnitude higher than infrared stimulated proton tunneling rates in $KTaO_3$.

In the investigative example, rutile (001) $TiO_2$ single crystals grown by the flame fusion method were hydrogenated (deuterated) by annealing in $H_2O$ ($D_2O$) vapor at elevated temperatures. The dynamics were investigated using the same transient bleaching technique as for $KTaO_3$ in combination with high-resolution infrared absorption spectroscopy. That is, a pump beam was used to irradiate the $TiO_2$ in accordance with the present invention. The transient bleaching signal $S_b$ for the O-D stretch mode is shown in FIG. 7A revealing a lifetime of $T_1=5.41$ ps. This is in excellent agreement with the measured infrared linewidth $\Gamma=0.97\ cm^{-1}$ ($T_1=1/(2\ pi\ c\ T_1)=5.47$ ps at 80K). The O—H lifetime was found to be close to the laser pulsewidth at $T_1\sim1.5$ ps and consistent with the linewidth of $\Gamma=3.03\ cm^{-1}$ ($T_1\sim1.75$ ps) as illustrated in FIG. 7B. The agreement between measured lifetime and linewidth indicates that inhomogeneous broadening mechanisms do not play a significant role in $TiO_2$.

Figure 8:
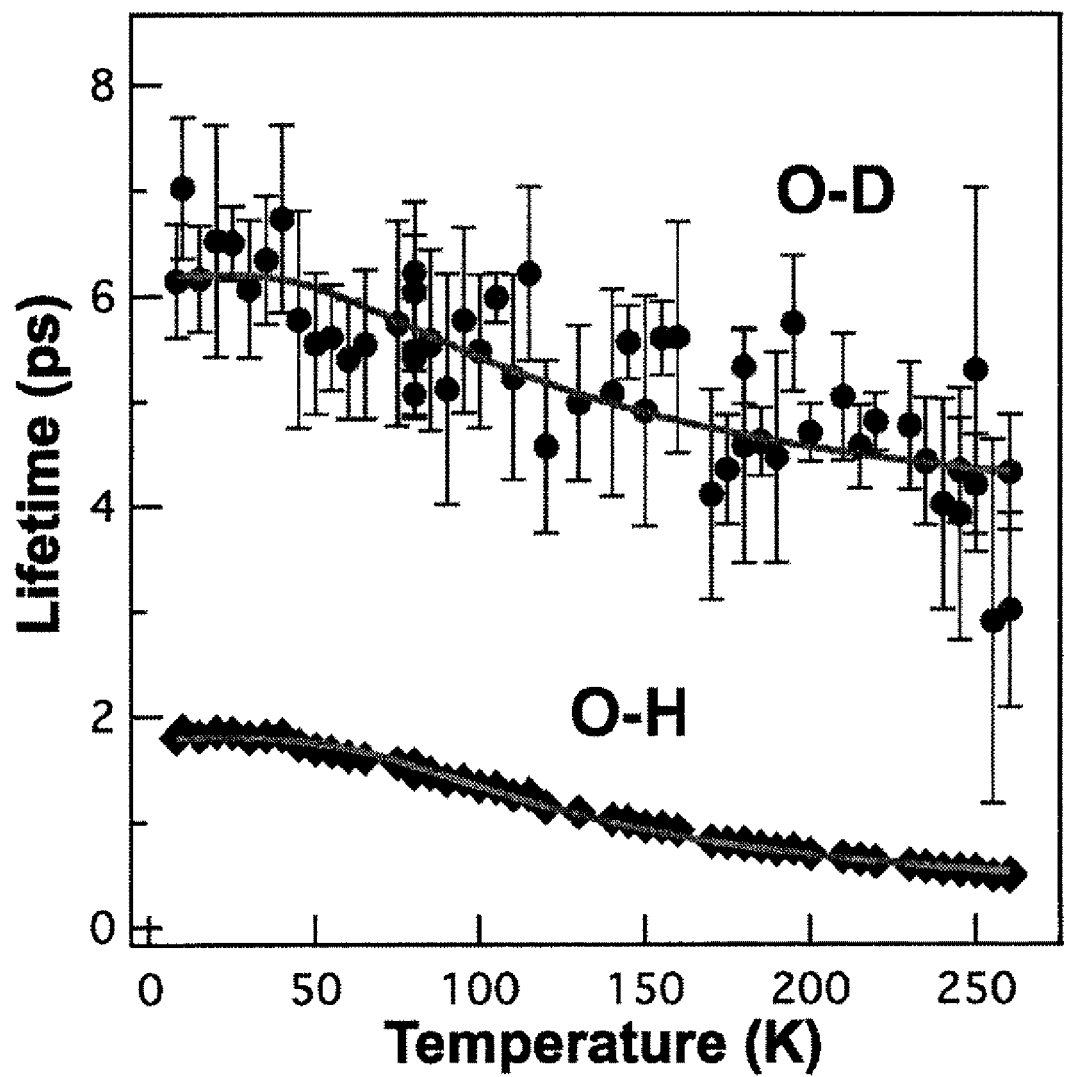
FIG. 8 is a graph depicting the vibrational lifetimes of the O—H and O-D stretch modes as a function of temperature for a titanium dioxide proton conductor.

The temperature dependence of the vibrational lifetime provides valuable information about the proton dynamics. FIG. 8 shows $T_1$ as a function of temperature for the O—H and O-D stretch modes. The latter was measured directly by the transient bleaching technique and the former was obtained from the linewidth ($\Gamma$) given by $$\Gamma = \frac{1}{2\pi c T_1} + \frac{1}{\pi c T_2^*} \tag{1}$$

using the dephasing time $T_2^*$ determined from the linewidth of the O-D mode. According to the frequency gap which relates hydrogen local mode phonon decay order to vibrational lifetime, the observed lifetime of ~2 ps for O—H and ~5 ps for O-D correspond to a one or two phonon decay channel. The highest phonon frequencies in $TiO_2$ are around 850 cm$^{-1}$ and do not meet this requirement. Additionally, the inclusion of a high frequency bend mode (1000-1400 cm$^{-1}$ for O—H) would still constitute a 3-phonon process. Moreover, the shape in FIG. 8 of the O—H and O-D lifetime temperature dependence is not characteristic of a multiphonon decay. Therefore this cannot be the dominant relaxation channel for the O—H and O-D stretch modes in TiO$_2$.

Vibrational decay via a proton transfer step can occur by a classical over the barrier motion or quantum mechanical tunneling. The latter is unlikely because the observed isotope effect is too small. Tunneling would predict a factor of at least several hundred based on a simple adiabatic approximation (e. g. using the WKB method) of tunnel probabilities in a double well potential. Thus, the most likely decay channel is a classical transport process.

The observed isotope effect is consistent with a transport process as the lighter ion would migrate more readily and thus make fewer oscillations in the initial potential well. Lifetime measurements indicate that deuterium makes 440 oscillations and hydrogen makes only 197 oscillations prior to the transfer step. In TiO$_2$, the stretching direction of the O—H dipole has a relatively large O—O separation of 3.327 A with a correspondingly large activation energy of 1.28 eV. Therefore, migration across the open c-channel of TiO$_2$ is unlikely. This is in contrast to KTaO$_3$ where the interoxygen separation is less than 3 A and the OH . . . O transfer has recently been shown to be energetically favorable over reorientations about the host oxygen ion.

In the TiO$_2$ example, an excellent fit of the lifetime temperature dependence (FIG. 8) was obtained to a model for a lattice-assisted proton hopping process where the time between jumps is given by $$\tau \approx A\Omega e^{2u^2 \tan h(\hbar\Omega/4k_bT)}$$

where $\Omega$ is the frequency of the assist phonon and A and u are constants related to the coupling strength. Fits to the data yielded assist phonon frequencies of 372±8.6 cm$^{-1}$ for the O—H lifetime and 278±60.5 cm$^{-1}$ for the O-D data. Both assist phonon frequencies are within the bulk phonon bands, but it is unlikely that both isotopes transfer via different assist phonons. The ratio of the assist phonon frequencies is 1.34 and is in excellent agreement with the ratio of the O—H and O-D stretch modes, therefore indicating the bending motion is the most likely assist mode responsible for promoting the proton over the potential barrier. This assignment is consistent with the path shown.

Careful high-resolution Fourier transform infrared (FTIR) measurements revealed the O—H and O-D overtones at 5920 cm$^{-1}$ and 4355 cm$^{-1}$ at 10K, respectively. The ratio of the high frequency lines observed here is $v_{OH}(5920)/v_{OD}(4355)$= 1.359 which agrees very well with the ratio of fundamental frequencies $v_{OH}(3287)/v_{OD}(2445)$=1.344. Both of these values are in excellent agreement with isotopic ratios found in other oxides. The overtone analysis predicts that the stretch mode potential is indeed quite anharmonic.

Figure 9:
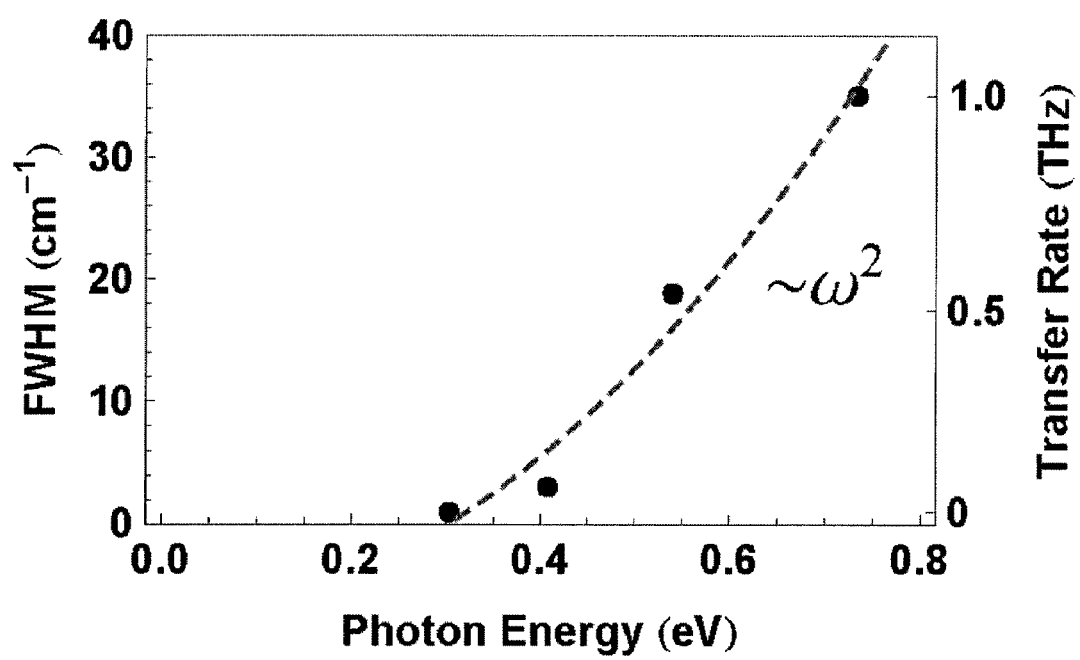
FIG. 9 is a graph of the infrared linewidths for energy levels occupying the hydrogenic stretch mode potential well in titanium dioxide.

FIG. 9 shows the linewidths of the O—H and O-D vibrational modes, which become broader with increasing energy. The broad linewidths of the higher levels are indicative of a very short upper state lifetime and hence a very high transfer rate. It is evident from the figure that the transfer rate approaches zero at an excitation energy of 0.3 eV, which is therefore the energy corresponding to the barrier height for this transport process. This value is in excellent agreement with the 0.2-0.4 eV barriers calculated by Wardle and co-workers for H reorientation and transfer steps in wurtzite ZnO. Furthermore, it is important to point out that the O—O separations in TiO$_2$ are about 80% shorter than in ZnO.

The high proton transport rates (inverse lifetimes) observed in this work are also consistent with hydrogen diffusion experiments in TiO$_2$ and other oxides. For example, in KTaO$_3$, the diffusion coefficient (near 500° C.) is significantly smaller than in TiO$_2$ and agrees very well with the long lifetimes in KTaO$_3$ that are up to two orders of magnitude longer than in TiO$_2$. Additionally, the infrared linewidths in TiO$_2$ are much broader than in KTaO$_3$, which points towards coupling to a much more efficient transfer process.

The above analysis suggests that the O—H and O-D stretch modes are relatively unstable oscillations, which quickly couple to a transverse mode with a much lower potential barrier. This transverse oscillation then behaves as an assist phonon and promotes the proton to the next oxygen host. Furthermore, this migration process can be stimulated by infrared photon absorption. The stimulated proton transfer rate is on the order of 1 THz or two orders of magnitude greater than previously shown in the perovskite oxide KTaO$_3$. It is reasonable to expect that infrared stimulated migration is possible in similar oxides (e.g. SnO$_2$, HfO$_2$, ZnO, among others) in which hydrogen is a highly mobile defect. Thus, this technique could be used to provide higher proton conductivity in solid oxide fuel cell electrolytes without significant increase in operational temperature. Additionally, this fundamental insight into the microscopic dynamics of protons in TiO$_2$ establishes a new important link between O—H vibrational modes and proton migration in proton conducting oxides.

The advantages of the present invention are numerous. The proton conductor system provides for enhanced proton transport across solid oxides. By irradiating the solid oxide with infrared light at wavelength(s) that match the absorption frequency of one or several hydrogen local vibrational modes, proton migration though the solid oxide is increased. This increase in diffusivity can lower the effective operational temperature of the solid oxide. Further, if the solid oxide is a metal oxide, the protonic current for a given applied voltage increases, thereby increasing the electrical power capabilities of the metal oxide.

The proton conductor system described herein will be useful in several important commercial applications. Utilizing the methods of the invention, metal oxide proton conductors are able to provide sufficient proton transport to be operationally useful at lower temperatures. This improves the usefulness of proton conductors for any application where a high electrolytic current is used. Examples include high power applications such as solid oxide fuel cells, dehydrogenation pumps, steam electrolyzers for hydrogen production, and hydrogen sensors. In terms of the present invention's incorporation in a fuel cell, the present invention can be adapted for use with different "fuel" gases including, but not limited to, pure hydrogen, methanol, ethane, or other hydrocarbon fuels.

INCORPORATION BY REFERENCE

All publications, patents, and patent applications cited herein are hereby expressly incorporated by reference in their entirety and for all purposes to the same extent as if each was so individually denoted.

EQUIVALENTS

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

The articles "a" and "an" are used herein to refer to one or to more than one (i.e. to at least one) of the grammatical object of the article. By way of example, a metal oxide means one metal oxide or more than one metal oxide.

Any ranges cited herein are inclusive.

We claim:

1. A proton conductor system, comprising:
   a solid oxide having at least one hydrogen vibrational mode defined by a bandwidth and resonance frequency; and
   a light source for irradiating said solid oxide with infrared light in a wavelength band having a center frequency matching said resonance frequency.

2. A proton conductor system as in claim 1, wherein said bandwidth is greater than said wavelength band of said infrared light.

3. A proton conductor system as in claim 1, wherein said bandwidth is less than said wavelength band of said infrared light.

4. A proton conductor system as in claim 1, wherein said bandwidth is equal to said wavelength band of said infrared light.

5. A proton conductor system as in claim 1, wherein said solid oxide comprises a metal oxide having an atomic composition that includes at least one oxygen atom and at least one metallic element atom.

6. A proton conductor system as in claim 1, wherein said solid oxide comprises a metal oxide having host ions, said metal oxide being doped with transition-metal ions having a lower valence than said host ions.

7. A proton conductor system as in claim 1, wherein said infrared light passes through said solid oxide, said proton conductor system further comprising means for directing said infrared light so-passed through said solid oxide back to said solid oxide.

8. A proton conductor system as in claim 1, wherein said solid oxide comprises a plate-like structure.

9. A proton conductor system as in claim 1, wherein said solid oxide comprises a tubular structure.

10. A proton conductor system as in claim 5, wherein said solid oxide comprises a metal oxide and said proton conductor system further comprises:
    a first electrode serving as an anode coupled to said metal oxide; and
    a second electrode serving as a cathode coupled to said metal oxide, said second electrode being spaced apart from said first electrode.

11. A proton conductor system as in claim 10, wherein said metal oxide is positioned between said first electrode and said second electrode.

12. A proton conductor system as in claim 10, further comprising:
    a fuel gas exposed to said first electrode; and
    an oxidizer exposed to said second electrode.

13. A proton conductor system as in claim 12, wherein said fuel gas comprises a hydrogen-based gas.

14. A proton conductor system, comprising:
    a metal oxide having an atomic composition that includes at least one oxygen atom and at least one metallic element atom, said metal oxide having a hydrogen vibrational mode defined by a bandwidth and resonance frequency; and
    a light source irradiating said metal oxide with infrared light in a wavelength band having a center frequency, said wavelength band being less than said bandwidth, and said center frequency matching said resonance frequency.

15. A proton conductor system as in claim 14, wherein said metal oxide is doped with transition-metal ions having a lower valence than host ions of said metal oxide.

16. A proton conductor system as in claim 14, wherein said infrared light passes through said metal oxide, said proton conductor system further comprising reflector means for directing said infrared light so-passed through said metal oxide back to said metal oxide.

17. A proton conductor system as in claim 14, wherein said metal oxide comprises a plate-like structure.

18. A proton conductor system as in claim 14, wherein said metal oxide comprises a tubular structure.

19. A proton conductor system as in claim 14, further comprising:
    a first electrode serving as an anode coupled to said metal oxide; and
    a second electrode serving as a cathode coupled to said metal oxide and spaced apart from said first electrode.

20. A proton conductor system as in claim 19, wherein said metal oxide is positioned between said first electrode and said second electrode.

21. A proton conductor system as in claim 19, further comprising:
    a fuel gas exposed to said first electrode; and
    an oxidizer exposed to said second electrode.

22. A proton conductor system as in claim 21, wherein said fuel gas comprises a hydrogen-based gas.

23. A method of enhancing proton transport through a solid oxide, comprising the steps of:
    providing a solid oxide having at least one hydrogen vibrational mode defined by a bandwidth and resonance frequency; and
    irradiating said solid oxide with infrared light in a wavelength band having a center frequency matching said resonance frequency.

24. A method according to claim 23, wherein said bandwidth is greater than said wavelength band of said infrared light.

25. A method according to claim 23, wherein said bandwidth is less than said wavelength band of said infrared light.

26. A method according to claim 23, wherein said bandwidth is equal to said wavelength band of said infrared light.

27. A method according to claim 23, wherein said solid oxide comprises a metal oxide having an atomic composition that includes at least one oxygen atom and at least one metallic element atom.

28. A method according to claim 23, wherein said solid oxide comprises a metal oxide having host ions, said method further comprising the step of doping, prior to said step of irradiating, said metal oxide with transition-metal ions having a lower valence than said host ions.

29. A method according to claim 23 wherein, pursuant to said step of irradiating, said infrared light passes though said solid oxide, said method further comprising the step of directing said infrared light so-passed through said solid oxide back to said solid oxide.

30. A method according to claim 23, wherein said solid oxide comprises a metal oxide and said method further comprises the steps of:
    providing a first electrode serving as an anode coupled to said metal oxide;
    providing a second electrode serving as a cathode coupled to said metal oxide in a spaced apart relationship relative to said first electrode;

exposing said first electrode to a fuel gas during said step of irradiating; and exposing said second electrode to an oxidizer during said step of irradiating.

31. A method according to claim 30, wherein said fuel gas comprises a hydrogen-based gas.

32. A method of enhancing proton transport through a metal oxide, comprising the steps of:
   providing a metal oxide having an atomic composition that includes at least one oxygen atom and at least one metallic element atom, said metal oxide having a hydrogen vibrational mode defined by a bandwidth and resonance frequency; and
   irradiating said metal oxide with infrared light in a wavelength band having a center frequency, said wavelength band being less than said bandwidth, and said center frequency matching said resonance frequency.

33. A method according to claim 32, wherein said solid oxide comprises a metal oxide having host ions, said method further comprising the step of doping, prior to said step of irradiating, said metal oxide with transition-metal ions having a lower valence than said host ions.

34. A method according to claim 32 wherein, pursuant to said step of irradiating, said infrared light passes though said metal oxide, said method further comprising the step of directing said infrared light so-passed through said metal oxide back to said metal oxide.

35. A method according to claim 32, further comprising the steps of:
   providing a first electrode serving as an anode coupled to said metal oxide;
   providing a second electrode serving as a cathode coupled to said metal oxide in a spaced apart relationship relative to said first electrode;
   exposing said first electrode to a fuel gas during said step of irradiating; and
   exposing said second electrode to an oxidizer during said step of irradiating.

36. A method according to claim 35, wherein said fuel gas comprises a hydrogen-based gas.

* * * * *